(12) United States Patent
Lazauski et al.

(10) Patent No.: US 6,519,547 B2
(45) Date of Patent: Feb. 11, 2003

(54) METHOD FOR DETERMINING ACOUSTIC IMPACT OF UNDERWATER ACOUSTIC SOURCES ON MARINE ANIMALS

(75) Inventors: Colin J. Lazauski, West Kingston, RI (US); Glenn H. Mitchell, Jamestown, RI (US); Thomas N. Fetherston, II, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 130 days.

(21) Appl. No.: 09/770,761

(22) Filed: Jan. 23, 2001

(65) Prior Publication Data

US 2002/0099515 A1 Jul. 25, 2002

(51) Int. Cl.[7] .................. G01V 1/38; A01M 29/02; G06F 15/00
(52) U.S. Cl. .............. 702/139; 702/159; 367/139; 367/188
(58) Field of Search ............... 702/139, 150, 702/159; 367/139, 111, 173, 188; 116/22 A; 181/122, 401, 402

(56) References Cited

U.S. PATENT DOCUMENTS

| | | | |
|---|---|---|---|
| 4,955,005 A | 9/1990 | Loeffelman | 116/22 A |
| 5,696,738 A | 12/1997 | Lazauski | 181/122 |
| 5,883,858 A | 3/1999 | Holt | 367/139 |

OTHER PUBLICATIONS

ERBE Christine, Farmer D.M.; "A software model to estimate zones of impact on marine mammals around anthropogenic noise" Sep. 20, 2000, 108 (3) 1327–1331, "The Journal of the Acoustical Society of America".

Phelps, Elizabeth I et al; "A multi–Disciplinary Approach to Evaluate Potential Impacts of Acoustic Energy to Protected Marine Life" Nov. 5–8, 2001, p. 1469–1473 vol. 3, "Oceans", 2001. MTS/IEEE Conference and Exhibition.

Mate B.R. and Harvey J.T.; "Acoustical Deterrents in Marine Mammal Conflicts with Fisheries". A workshop Held Feb. 17–18, 1986 at Newport, Oregon; pp. 85–89.

*Primary Examiner*—Kamini Shah
(74) *Attorney, Agent, or Firm*—Michael J. McGowan; Michael F. Oglo; James M. Kasischke

(57) ABSTRACT

A method is provided to estimate acoustic impacts to marine animals within a chosen area. The method begins with data collection on types of acoustic sources to be modeled, animal assemblages in the chosen area, environmental characteristics of the area and on relevant environmental regulations. An acoustic model, appropriate for the chosen area and its environmental characteristics, is then selected and generates a source footprint of all sources to be located at the site. The marine animal distribution is then overlaid onto the acoustic propagation at the site. The marine animal distribution is time-weighted to correspond with the proposed acoustic source usage, as well as short term and seasonal marine animal behavior patterns. The total number of impacted marine animals is then calculated. Impacts are calculated by species, source, scenario and season. The calculated number is then rounded upwards to the next whole individual, pod, or group, depending on the animals' behavior patterns.

21 Claims, 2 Drawing Sheets

METHOD FOR DETERMINING ACOUSTIC IMPACT OF UNDERWATER ACOUSTIC SOURCES ON MARINE ANIMALS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to environmental impacts of acoustic sources, and more particularly to quantitatively determine the acoustic impact of underwater acoustic sources on marine animals in a defined area of any body of water.

(2) Description of the Prior Art

Prior methods for determining acoustic impact on marine animals have either not quantitatively determined the number of animals effected, or if determining the number effected, have done so in a non-deterministic way. As an example, the Zone of Influence (ZOI) method determines the maximum range, or zone, around the acoustic source at which an animal is influenced under several criteria. The ZOI method establishes zones for such criteria as audibility, responsiveness, masking and hearing loss, discomfort, or injury. Although this method does give the distances at which marine mammals are affected by man-made noise, it does not determine the number of animals affected.

One present quantitative method, the Acoustic Integration Model (AIM), is able to count the number of animals influenced. It uses a statistical distribution of animals in depth and location combined with zones of influence. Inherent in the method is a Monte Carlo simulation that moves the animals in depth and location according to assumed behavior. Results are dependent on the average of many Monte Carlo simulation runs and on the accuracy of the input behavioral parameters. Each run of the Monte Carlo simulation provides a different result and can lead to incorrect attributions of the influence of model parameters because of this variance. In addition, running numerous Monte Carlo simulations is time consuming and costly. Further, the AIM method does not include the effects of the podding or herding tendencies of the animals.

SUMMARY OF THE INVENTION

Accordingly, it is an object of the present invention to provide a method to determine the acoustic impact of underwater acoustic sources on marine animals in a defined area of any body of water.

Another object of the present invention is to provide a method to determine the number of marine animals acoustically impacted by underwater acoustic sources in a defined body of water.

Still another object of the present invention is to provide a deterministic method for assessing the acoustic impact of underwater acoustic sources on marine animals in a defined area of any body of water.

Other objects and advantages of the present invention will become more obvious hereinafter in the specification and drawings.

In accordance with the present invention, a method is provided to quantify and predictively estimate acoustic impacts to marine animals within a chosen area. The method begins with information collection, including information on the types of acoustic sources to be modeled, on the animal assemblages in the chosen area, on the environmental characteristics of the area and on the environmental regulations relevant to acoustic impacts in the area. An acoustic model, appropriate for the chosen area and its environmental characteristics, is then selected. As an example, the Comprehensive Acoustic Simulation System/Gaussian RAy Bundle (CASS/GRAB) model for horizontally stratified and range-variant environments would be an appropriate model for the East Coast Shallow Water Training Range (ECSWTR). Given the acoustic source characteristics and environmental characteristics of the chosen area, the acoustic model generates a source footprint of all sources to be located at the site. Depending on the impact criteria governing the area, the acoustic model expresses the acoustic propagation at the site as Sound Pressure Level (SPL), Sound Exposure Level (SEL), or other energy based criteria consistent with the governing regulations. The marine animal distribution, based on the most current information for marine animal assemblages in the geographic range of the area in question, is then overlaid onto the acoustic propagation at the site. The marine animal distribution is time-weighted to correspond with the proposed acoustic source usage, as well as short term and seasonal marine animal behavior patterns. The total number of impacted marine animals is then calculated. Impacts are calculated by species, source, scenario and season. The calculated number is then rounded upwards to the next whole individual, pod, or group, depending on the animals' behavioral patterns and social structure. The acoustic test procedure, acoustic sources, source locations, or other criteria relevant to the number of marine animals impacted can then be modified to ameliorate the acoustic impacts.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

DESCRIPTION OF THE PREFERRED EMBODIMENT

Figure 1:
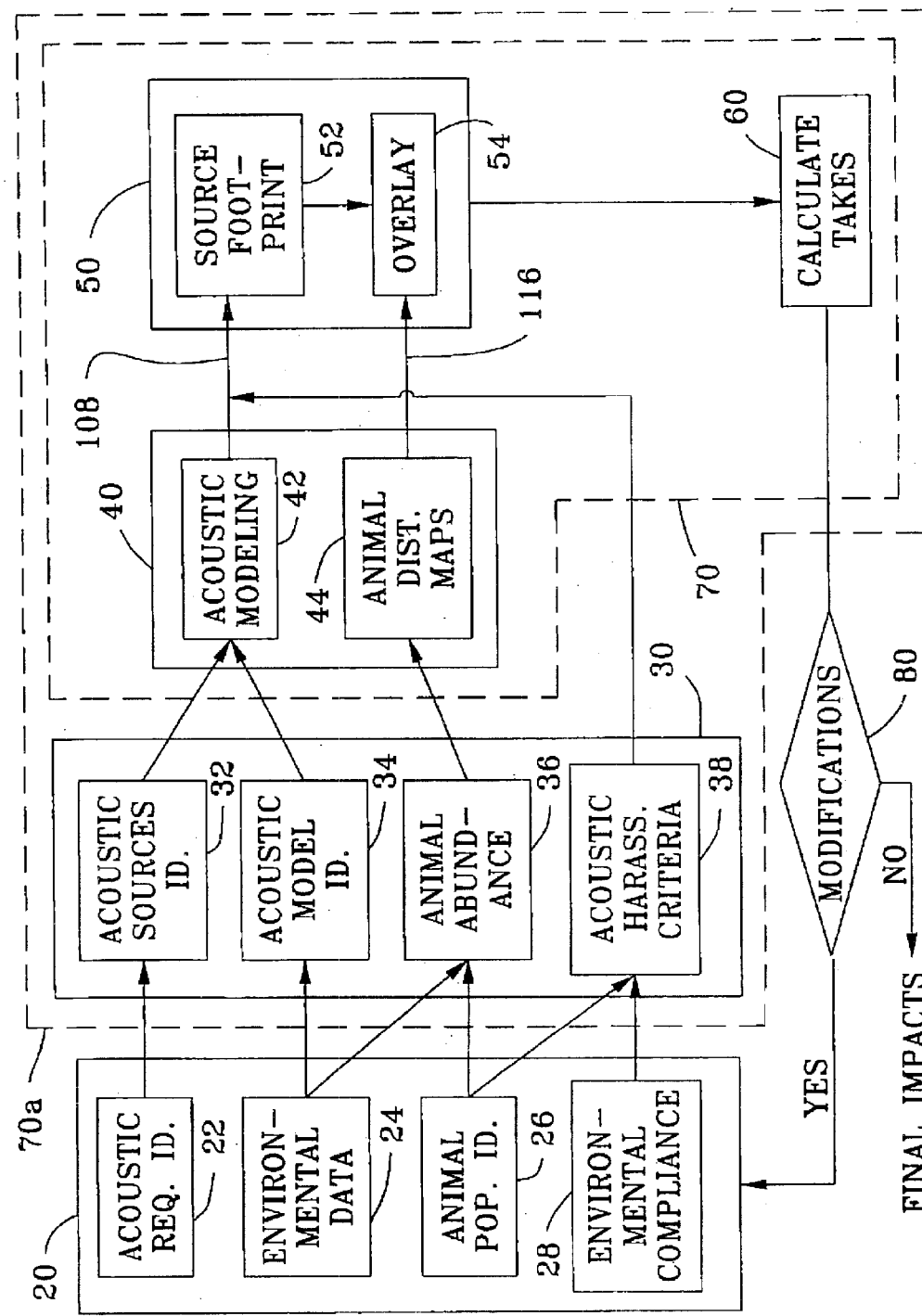
FIG. 1 is a flow chart diagram illustrating the method of the present invention.

Referring now to FIG. 1, there is shown a flow chart illustrating the method 10 for quantitatively estimating acoustic impacts to marine animals. Method, or process 10 incorporates five major modules used in determining the marine animal impacts of acoustic sources. The process 10 begins with information collection at 20. The information is sifted at module 30 for relevance to the particular cases being examined. The information is processed at module 40 to model the acoustic sources and obtain animal population distribution maps. Post processing module 50 obtains the acoustic footprints from module 40 and overlays these with the animal distribution maps. Finally, module 60 calculates and tabulates the results as animal takes, or total impacts by species, scenario, source and/or season. In a preferred embodiment, the information from module 30 is input to a computer, indicated by dashed line 70, which implements modules 40, 50 and 60. The method may further include a modification decision at 80 whether to change all or part of the information input to module 20, or accept the number of takes as the final impact assessment. Modifications can include changes in site, acoustic source changes, acoustic source locations, test scenario changes, or modifications to other criteria affecting the take calculation.

In information collection module 20, method 10 determines the parameters affecting the overall impact scenario. This includes determining the requirements driving the use of acoustic sources in the marine environment, shown in FIG. 1 as acoustic requirements identification 22. As an example, training of Navy sonar technicians requires active sonar detection in an underwater environment, with different training objectives requiring different mixes of acoustic sources, durations, intensities and the like. The acoustic requirements for each training objective would be identified at 22.

Environmental data for the chosen site is gathered at 24. This includes bottom profiles, bottom losses, sound velocity profiles and other site-specific data affecting the acoustics and animal behavior at the site. The environmental data is preferably obtained from direct measurements at the site in order to obtain the most up to date and accurate information. The data may be compared with historical records to verify results.

The animal population at the site is identified at 26. A complete review of marine animal distribution in the geographic range of the area in question is performed. The review is initially the presence or absence of marine animals within the area that may be affected by acoustic transmissions. This initial list is all inclusive of species for which the analysis must be performed and which could be found in the general area at any time of the year. The necessary information is gathered from all available sources. Relevant papers include those that describe a particular marine animal species, or group of species, spatial and temporal distribution, abundance, habitat use, social behavior, feeding habits and other subject matter related to the ecology of the species or group of species in question. Applicable museum and whaling records are also used in the definition of each species used in the model.

Finally, governing environmental regulations at the site are identified at 28. Relevant regulations, treaties and laws, inclusive of state, federal and international requirements, must be examined for application to determine acoustic impacts. Examples of relevant regulations include the Marine Mammal Protection Act and the Endangered Species Act.

The second module, or sifting module 30, analyzes the data gathered at module 20 and determines the specific requirements for the impact scenario being analyzed. The specific acoustic sources impacting the marine environment are identified at 32. The acoustic source identification process compares the requirements identified at 22 with known acoustic source specifications, choosing the acoustic source, or sources, best matching those requirements. Complete description of equipment or sources to be used during a test or exercise must be considered. Relevant information is found in the system description of projector or impulsive sources. Source levels, wave characteristics, directivity, and other information particular to the source are examples of data used in comparing requirements to equipment specifications. Scenarios (how the source is used in time and space) for use of the equipment in the area must be detailed for accuracy of model outputs.

Based on the environmental data obtained at 24, an acoustic model is chosen at 34. As with acoustic source identification 32, the acoustic analysis tool best modeling the environment is chosen. For example, in a shallow water, horizontally stratified environment having varying bottom depths and sediment types, the well-known Comprehensive Acoustic Simulation System/Gaussian RAy Bundle (CASS/GRAB) model provides adequate results.

Based on the animal population data of 26 and the environmental data of 24, animal abundance figures for the site are determined at 36. The biological data is sorted to include those animals that utilize the specific habitat found at the site during any time of the year. In order to be used in the model, an estimate of local abundance must be assessed. The estimate must then be distributed throughout the area in varying 'densities' that coincide with habitat use. The estimate is obtained from available surveys and analyses of marine animal populations, such as those of the National Marine Fisheries Service. Seasonal variations are considered when such data are available, with impacts analyzed by season rather than over a full year. When no seasonal data is available, the abundance levels are considered constant throughout the year. Habitat preference also affects animal abundance. Generally, if the area under study consists of an optimum habitat for a species, population abundance is maximized within that habitat. For less than optimum habitat areas, allowances are made for excursions from optimum habitat areas by distributing a percentage of the local population both inshore and seaward from the optimum habitat area. As with other data, the percentage used is based on surveys, sightings, etc. that provide a ratio of out-of-habitat sightings to habitat sightings. Where no out-of-habitat data exists, a conservative estimate of 10% can be used. Finally, social group size of each species is considered. Marine mammals exhibit grouping and social behavior that can vary by season or geographic location. A statistical mode from a data set and range, taken from marine mammal characterization reports in the literature, are used to characterize groupings. As an example, small group size is a common characteristic of all baleen whales and all large whales. The average number of individuals reported per sighting was three, with a mode of 1 and a range of 1 to 65. The data further indicates that more than 50% of sightings were that of a single individual. Thus, for this group of animals, a single individual is chosen as a representative group, or pod size.

The animal population data of 26 in combination with the environmental compliance requirements of 28 generate the acoustic harassment criteria at 38. Complete review of criteria for measuring acoustic harassment is determined using a combination of the laws, previous precedents for acoustic harassment criteria and available scientific publications relating to acoustic effects on marine animals. Types of criteria can be expressed as Sound Pressure Level (SPL), sound intensity level, or an energy based criteria such as Sound Exposure Level (SEL), energy flux density level, or energy source level. The decision to use any criteria is based upon availability of scientific information and how appropriate the choice is when considering the type of sound source—impulsive, broadband, tonal, pulsed, or continuous in time and frequency.

In processing module 40, the acoustic source identification of 32 and the acoustic model identification of 34 provide the necessary input data for acoustic modeling at 42. Acoustic modeling module 42 provides results for each separate acoustic region encompassed by the site, e.g., a continental shelf region, a shelf break region and a region sloping down to deep ocean depths.

Module 40 also processes the animal abundance data of 36 to obtain animal distribution maps at 44. These maps determine the number of marine animals, which may be influenced by the acoustic sources in the proposed area. The animal abundance data of 36 are transcribed onto the range area maps to obtain animal distribution maps of the site. Seasonal variations and distribution with water depth are represented.

Post processing module 50 receives the results of acoustic modeling 42 and combines these results with the acoustic harassment criteria of 38 to obtain a source footprint at 52, which corresponds to acoustic harassment levels at the site. The acoustic modeling of 42 provides the propagation loss results for the site, indicating how the acoustic energy from a source decreases with distance from the source. Essentially, the harassment criteria of 38 limits the range of the acoustic source to those areas surrounding the source where the acoustic energy exceeds the developed criteria. For each source-modeling region, the maximum harassment range is determined in eight separate directions, i.e., at 45° increments about the source. Connecting the maximum ranges for a set of all angles results in a propagation rosette about the source for that region. Where appropriate for the environmental aspects of the site, symmetry is used to reduce the number of directional calculations. The animal distribution maps of 44 and the source footprint of 52 are overplayed at 54, with the result being processed at take calculation module 60 to obtain the final number of animals takes, or animals impacted by the acoustic sources in accordance with the environmental compliance criteria applicable to the site.

Figure 2:
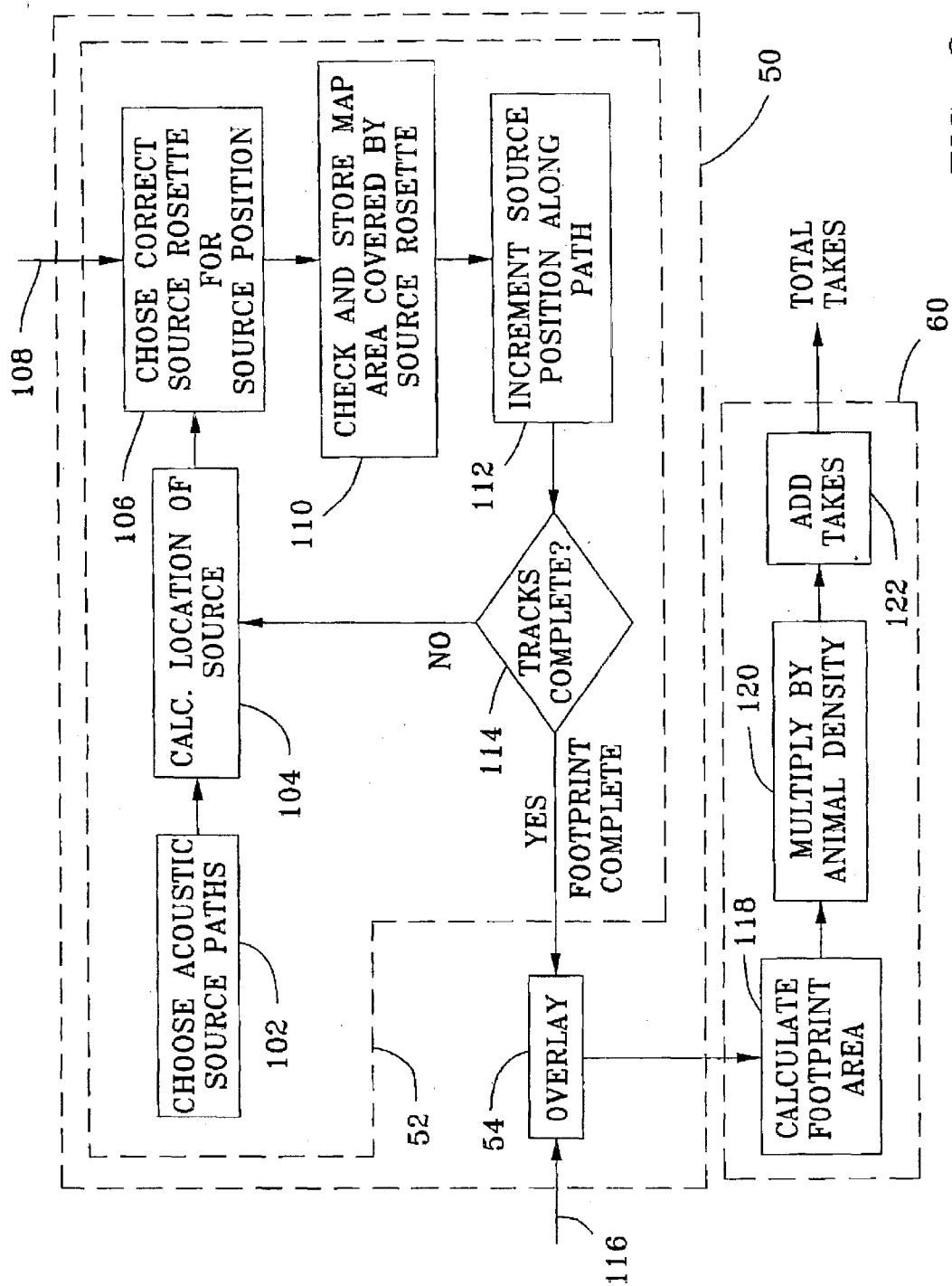
FIG. 2 is a flow chart diagram illustrating the combination of animal, environmental and acoustic data to obtain a quantitative assessment of impacted animals.

Referring now to FIG. 2 there is shown a flow chart illustrating post processing module 50 and calculation module 60 in greater detail. For most acoustic test scenarios, the acoustic source is allowed, or required, to maneuver over the test site. Method 10 can consider up to a total of six paths covering the test site. As an example, a typical rectangular site may include a continental shelf region, a shelf break and a region sloping down to deep ocean depths. Six paths are necessary to adequately cover such a site: three parallel to the shelf break (on the shelf, at the break and along the slope), one perpendicular to the shelf break, and two diagonal paths. For other sites with a single topography, e.g., those having only a continental shelf portion, only one to three paths may be necessary to describe the acoustic propagation throughout the site, i.e., a diagonal, along the shelf, or across the shelf. Where a stationary source is to be used, the path would consist of a single point at the source location. The appropriate paths are chosen at 102.

Site location corresponding the position on the path or track is calculated at 104. For each location, the acoustic source rosette corresponding to that location is chosen at 106 from input 108 of module 40 and harassment criteria 38. The site area covered by the rosette is stored at 110. The source position is incremented at 112 and a check is made at 114 to see if all track positions have been included. If not, module 52 returns to 104 to calculate the next source location. If all tracks are complete, the acoustic footprint consisting of all the stored site area coverages is input to overlay module 54. Each animal species for which harassment criteria is available has a representative distribution by depth as shown by the animal distribution maps of 44. Overlay module 54 creates a data file of bathymetric data and animal distribution maps input 116 and corresponding acoustic footprints from 52.

Calculation module 60 receives the data file from module 54 and first calculates the footprint area for each bathymetric interval at the site for each track, or path, at 118. Each track or path is calculated separately as the source is moving through the site at separate time intervals, thus each track is separately capable of affecting the animal population and overlapping areas of the tracks need to be counted for each track. The bathymetric footprint area is then multiplied, at 120, by the animal density in each bathymetric interval to obtain the number of takes for each depth interval, i.e., the footprint area is multiplied by the total number of mammals in the depth interval (from the distribution map input 116) and divided by the total map area. The takes for each track and bathymetric interval are added together at 122 to obtain the total takes. It is noted that the total takes is rounded upwards to conform to the pod or group size of the marine animal being considered, as described previously.

The invention thus been described is a method for determining the acoustic impact of underwater acoustic sources on marine animals in a defined area of any body of water. The method includes assembling data about the environmental and acoustic characteristics of the site, about the acoustic sources to be used at the site, about marine animals known to inhabit the area and about marine animal acoustic harassment criteria pertinent to the site. Based on the above, acoustic modeling is performed and the areas within the site having acoustic energy levels above the harassment criteria are identified. These source footprints are overplayed with animal distribution maps to obtain the total number of takes, or animals impacted by the acoustic sources. The method overcomes the shortcomings of previous impact assessment methods. In comparison to the ZOI method, the method of the present invention provides a quantitative assessment of the number of animals impacted. Unlike the random behavior simulation of the AIM method, the method of the current invention determines the number of animals within the site using the best available animal population data.

Although the present invention has been described relative to a specific embodiment thereof, it is not so limited. As an example, computer 70 may encompass module 30 (indicated by dashed line 70a) such that the data gathered at module 20 is input to computer 70a as data files. The sifting process of module 30 can then be implemented within computer 70a, or the data files may be displayed for sifting by an operator.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for determining impacts of at least one acoustic source on marine animals, comprising:

gathering data on parameters relative to a marine environment adjacent the at least one source, acoustic requirements necessitating the use of the at least one acoustic source, animal populations within the marine environment and environmental compliance standards applicable to the marine environment;

sifting the data to identify the at least one acoustic source, to identify an acoustic modeling technique, to determine animal abundance figures for the marine environment and to determine acoustic harassment criteria applicable to the animal populations within the marine environment;

processing the sifted data to obtain acoustic energy profiles and animal distribution maps; and combining the acoustic energy profiles, distribution maps and harassment criteria to obtain a number of marine animals impacted.

2. The method of claim 1 wherein the sifted data is input to a computer, the computer outputting the number of marine animals impacted.

3. The method of claim 1 wherein the data gathering further comprises:

obtaining bottom profiles, bottom losses and sound velocity profiles for the marine environment;

identifying animal species inhabiting the marine environment; and determining spatial and temporal distributions for each species identified.

4. The method of claim 3 wherein the sifting further comprises:

choosing the at least one acoustic source best matching the acoustic requirements; and providing source levels, directivity and wave characteristics for the at least one chosen acoustic source.

5. The method of claim 4 wherein the sifting further comprises applying the spatial and temporal distribution data to the marine environment to obtain the animal abundance figures.

6. The method of claim 5 wherein the sifting further comprises:

applying the environmental compliance standards over the marine environment to obtain the acoustic harassment criteria for the marine environment; and expressing the harassment criteria in terms of at least one of sound levels and energy based criteria.

7. The method of claim 6 wherein the processing further comprises transcribing the animal abundance figures onto the bottom profiles to obtain the animal distribution maps.

8. The method of claim 7 wherein the combining further comprises:

determining a source footprint wherein the acoustic energy level for the at least one source exceeds the harassment criteria;

overlaying the source footprint and the animal distribution map to obtain a data file of bathymetric data and animal distribution maps; and multiplying the source footprint by the corresponding animal distribution maps and dividing by a total area encompassed by the adjacent marine environment to obtain the number of marine animals impacted.

9. The method of claim 8 further comprising:

modifying at least one of the marine environment and the acoustic requirements when the number of marine animals impacted exceeds a predetermined limit; and returning to gather data on the modified parameters.

10. The method of claim 8 wherein the at least one source is non-stationary.

11. The method of claim 10 wherein determining the source footprint further comprises:

choosing at least one path for the source;

calculating a source location on the path;

determining a location footprint for the non-stationary source at the location;

storing the location footprint;

determining if the non-stationary source has completed the chosen path;

incrementing the source location along the path when the chosen path has not been completed; and returning to determine the location footprint at the incremented location, the stored location footprints forming the source footprint.

12. The method of claim 9 wherein the sifted data is input to a computer and the computer outputs the number of marine animals impacted.

13. The method of claim 11 wherein the sifted data is input to a computer, the computer outputting the number of marine animals impacted.

14. The method of claim 1 wherein the gathered data is input to a computer, the computer outputting the number of marine animals impacted.

15. The method of claim 14 wherein the computer displays the gathered data for sifting by an operator of the method.

16. The method of claim 6 wherein the sound levels include at least one of a sound pressure level and a sound intensity level.

17. The method of claim 6 wherein the energy based criteria include at least one of a sound exposure level, an energy flux density level and an energy source level.

18. A method for determining marine animal impacts from an acoustic source, comprising:

choosing a site for the acoustic source;

inputting environmental, acoustic and marine animal characteristics for the site;

processing the acoustic and environmental parameters to obtain acoustic energy propagation loss profiles for the source;

determining a footprint within the site where the acoustic energy exceeds predetermined acoustic harassment criteria for the marine animals;

calculating a number of marine animals impacted in the footprint; and iteratively modifying at least one of the chosen site and acoustic parameters to reduce the impacted marine animals below a predetermined number.

19. The method of claim 18 wherein the marine animal characteristics comprise abundance of marine animals by bathymetric depth region data.

20. The method of claim 19 wherein the footprint determination and impact calculation are accomplished for each bathymetric depth region, the marine animals impacted per each region being totaled to obtain the marine animals impacted in the footprint.

21. The method of claim 20 wherein:

the abundance data comprises data for each marine animal species at the site; and the impact calculation is performed separately for each species.

* * * * *